(12) United States Patent
Bodnar et al.

(10) Patent No.: US 6,195,907 B1
(45) Date of Patent: Mar. 6, 2001

(54) AIR BLOWER APPARATUS

(75) Inventors: Paul Bodnar, New Vernon; Rodger Gleason, Chester; Richard J. Macor, Asbury, all of NJ (US)

(73) Assignee: Quick Air, Inc., Asbury, NJ (US)

( * ) Notice: Subject to any disclaimer, the term of this patent is extended or adjusted under 35 U.S.C. 154(b) by 0 days.

(21) Appl. No.: 09/354,431

(22) Filed: Jul. 16, 1999

(51) Int. Cl.$^7$ ..................................................... F26B 19/00

(52) U.S. Cl. ................... 34/90; 34/666; 15/345

(58) Field of Search ............................... 34/271, 272, 90, 34/229, 666; 15/329, 339, 345; 417/371, 366, 428.8, 423.14

(56) References Cited

U.S. PATENT DOCUMENTS

| 5,727,330 | * | 3/1998 | Cucchi et al. | 34/666 |
| 5,893,218 | * | 4/1999 | Hunter et al. | 34/492 |
| 5,950,331 | * | 9/1999 | Coggins et al. | 34/666 |

OTHER PUBLICATIONS

Quick Fill Electric Pump displayed on INTEX web page, 1999.*

* cited by examiner

Primary Examiner—Stephen Gravini
(74) Attorney, Agent, or Firm—Kenneth P. Glynn, Esq.

(57) ABSTRACT

An air blower apparatus is described which has a blower unit, an attached base and a length of flexible hose used in combination to move volumes of air at speeds for the purpose of accelerating drying processes, for example, the drying of a freshly washed automobile. The apparatus is designed for operation with the blower unit remotely located from the user proximate ground level. The blower unit has a housing formed with an inlet and an outlet, and a motor inside having a shaft with blade means attached thereto for producing an air flow. The present invention also includes a base which is formed to attach the blower unit thereon for use close to or proximate ground level, and the base is also formed to position the blower unit thereon so that the inlet of the blower unit does not draw in debris close to or from the ground. The present invention also includes a hose which is flexible and attached to the blower housing outlet. The hose has a sufficient inner diameter to substantially maintain the air flow produced by the blower unit.

16 Claims, 2 Drawing Sheets

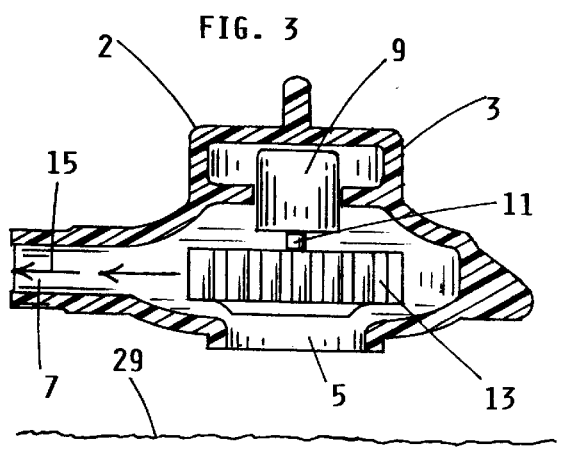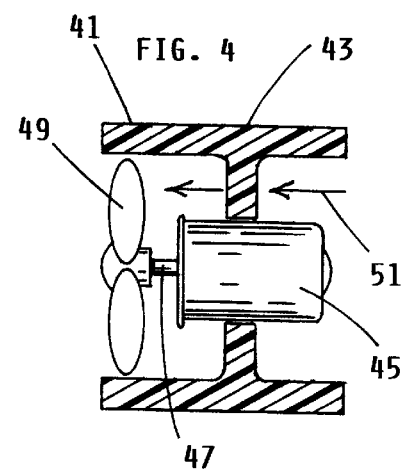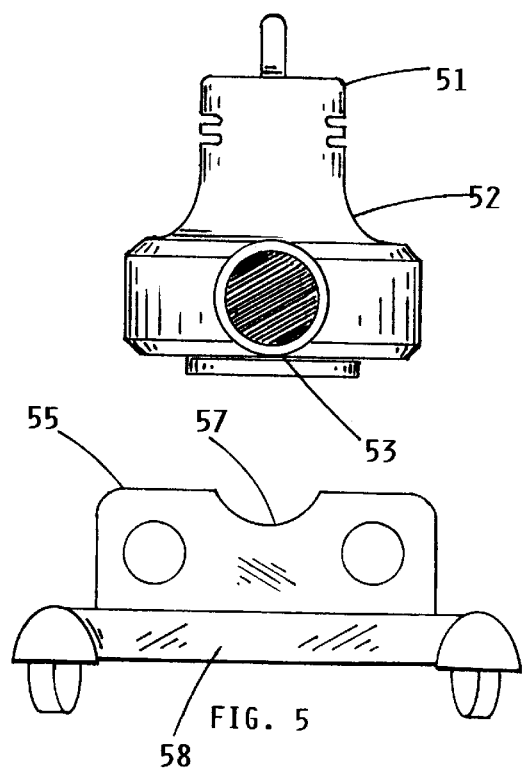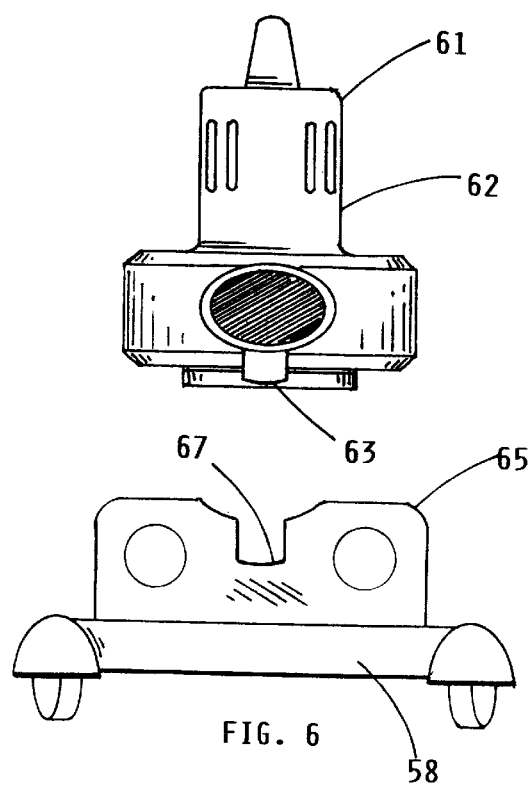

AIR BLOWER APPARATUS

FIELD OF THE INVENTION

The present invention relates to devices which can be used to accelerate drying processes, particularly air blowing devices used to move volumes of air at speeds, and most particularly small and medium size blower units having a housing, a motor, and blade means for producing and directing an air flow.

BACKGROUND OF THE INVENTION

There are various types of air blowing devices and apparatuses available which are used or can be used, to accelerate drying processes including, for example, the drying of a freshly washed automobile. Generally all air blowing devices, including fans and blower units have a housing on which a motor is mounted, of which a propeller or blade means is attached, to create and direct an air flow through the housing. Generally, the housings serve two basic purposes which are to provide for the attachment of a motor, and, to provide an enclosed airway for the air flow produced by the motor. The housings can be very simple like a short tube, or elaborate like a molded scroll type housing. The motors are usually mounted within the housing and can be small like the motors used in a hair dryer or large like the internal combustion engines used in commercial size leaf blowers. Accordingly, the motors can be powered by electricity or some form of fuel. In virtually all instances the motor of an air blowing device will have a shaft, on which a propeller or "blade means" (any form of propeller or air blade) is attached to produce an air flow through the housing of the device. Generally, if the motor and blade means produce an air flow which is parallel to the motor shaft, it is considered an axial type fan or air blowing device, and, if the motor and blade means produce an air flow which is perpendicular to the motor shaft, it is considered a centrifugal type air blowing device.

When contemplating the acceleration of drying processes, for example, drying a freshly washed automobile, the axial or fan type devices usually do not produce sufficient air speed to fully affect the drying process. Centrifugal type air blowing devices tend to more fully affect the drying process by moving large volumes of air at high speeds, however, they are generally too cumbersome and heavy for extended use and manipulation by hand. In addition, the centrifugal type air blowing devices are, by design, very noisy and can be harmful or at least objectionable if operated by hand, close to a user's ears.

SUMMARY OF THE INVENTION

The present invention involves an air blowing apparatus which has a blower unit, an attached base and a length of flexible hose used in combination to produce an air flow for the purpose of accelerating drying processes, for example, the drying of a freshly washed automobile. The apparatus is designed for operation with the blower unit remotely located from the user proximate ground level.

The present invention more particularly involves an air blower apparatus that comprises a blower unit having a housing formed with an inlet and an outlet, and a motor inside having a shaft with blade means attached thereto for producing an air flow through the housing. The blower apparatus also includes a base which is formed to attach the blower unit thereon for use close to or proximate ground level, and, the base is also formed to position the blower unit so that the inlet of the blower unit does not draw in debris close to or from the ground. The blower apparatus further includes a hose which is flexible and attached to the blower housing outlet and which has a sufficient inner diameter to substantially maintain the produced air flow.

Accordingly, it is an important objective of the present invention described herein to provide for an air blowing device or apparatus which can produce a high volume, high speed, air flow to effectively accelerate drying processes, with the drying of a freshly washed automobile contemplated. A high speed air flow tends to physically displace a liquid off of that which is being dried, while a high volume air flow tends to effectively evaporate and atomize the remaining liquid droplets.

It is another important objective of the present invention that it be operable by a user over extended periods without discomfort or fatigue.

It is another important objective of the present invention that it be operable by a user over extended periods without hearing discomfort.

It is yet another objective of the present invention that it be commercially viable, simple in design and cost-efficient to manufacture.

BRIEF DESCRIPTION OF THE DRAWINGS

FIG. 3 shows a right side elevation, cross-section view of the centrifugal blower unit shown in FIGS. 1 and 2;

FIG. 4 shows a right side elevation, cross section view of a prior art axial type blower unit;

FIG. 5 shows a front elevation view of a blower unit and mounting bracket formed for the mounting of that blower unit; and, FIG. 6 shows a front elevation view of another blower unit and mounting bracket formed for the mounting of that blower unit.

DETAILED DESCRIPTION OF THE DRAWINGS

Figure 1:
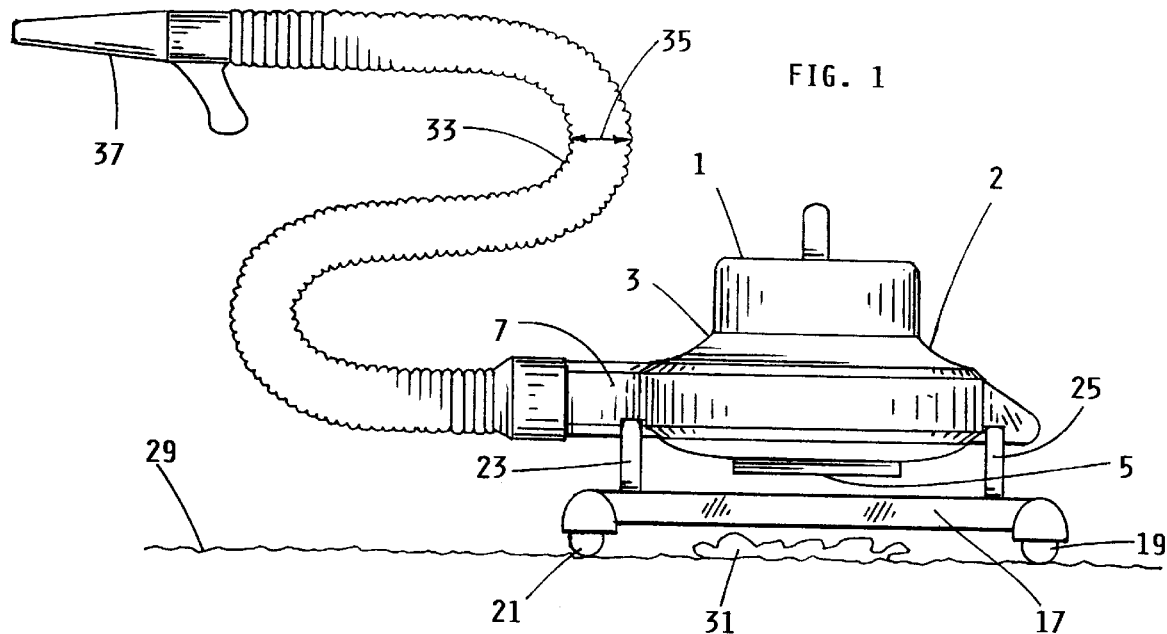
FIG. 1 shows a right side view of a present invention air blower apparatus comprising a centrifugal blower unit, a base for the blower unit, a hose and nozzle.

FIG. 1 illustrates a right side view of a present invention air blower apparatus comprising a centrifugal blower unit, a base for the blower unit, a hose and nozzle. Air blower apparatus 1 includes air blower unit 2 which has a housing 3. Housing 3 is molded from plastic and has air inlet 5 and air outlet 7. The motor (not seen in this view) inside housing 3 of blower unit 2 has a blade means attached (also not seen in this view) to produce an air flow through housing 3. Volumes of air at speed are drawn into inlet 5, move through and exit outlet 7. Blower unit 2 is attached to brackets 23 and 25 which are attached to base 17. Base 17 is formed for use proximate or close to ground level 29 so that blower unit 2 is also operated proximate or close to ground level 29. Accordingly, base 17 is provided with means for mobility at or proximate ground level. The means for mobility shown in this embodiment is four small caster type wheels of which two are shown in this figure as 19 and 21. Obviously, housing 3 could also easily be integrated with base 17 whereas base 17 is merely the lower portion of and part of housing 17. The present invention does not require a means for mobility, however, preferred embodiments of the present invention have a base 17 with at least three small wheels. Base 17 is further formed so that blower unit 2 is positioned thereon so that inlet 5 of blower unit housing 3 does not draw in debris represented by 31 found proximate ground level. Ground level 29 is defined herein as any substantially horizontal surface on which base 17 of air blower apparatus 1 may rest during operation or use. Therefore, ground level 29 can represent almost any surface, indoors or outdoors, which can support base 17 of the present invention during operation or use. Debris 31 is defined herein as anything (except air) which could be found proximate or close to ground level which could be drawn into inlet 5 of air blower housing 3, including, but not limited to dirt, sand, gravel, stones leaves etc. Debris that is drawn in and passed through blower unit 2 can often damage the automobile or whatever is being dried. Accordingly, base 17 is formed to position blower unit 2 thereon such that the inlet 5 does not draw in debris proximate ground level to prevent blower unit 2 from discharging debris onto whatever is being dried. In this embodiment shown here in FIG. 1, base 17 is merely formed solid to shield inlet 5 from debris 31 which is proximate ground level 29. Base 17 could be formed any number of ways to accomplish the same objective, for example, base 17 could provide means to attach blower unit 2 thereon with the inlet drawing air from the side or above. FIG. 1 also has a hose 33 attached to outlet 7 of housing 3. This hose has an inner diameter 35 which is equal to, or close to, the inner diameter of outlet 7 to maximize the performance of blower unit 2. Accordingly, preferred embodiments of the present invention should have a hose having a sufficient inner diameter to substantially maintain the air flow performance produced by the motor (not shown in this view) and moved through blower unit housing 3. Air blower apparatus 1 also has a nozzle attached at one end of hose 33 which can assist a user in directing the air flow produced and discharged by blower unit 2.

As specified earlier herein, it is an important objective of the present invention described herein to provide for an air blowing device or apparatus which can produce a high volume, high speed, air flow to effectively accelerate drying processes, with the drying of a freshly washed automobile contemplated. It is another important objective of the present invention that it be operable by a user over extended periods without discomfort or fatigue, and that it further be operable by a user over extended periods without hearing discomfort. The present invention is the result of the combined objectives, wherein, an air blower apparatus is designed for operation with the blower unit remotely located from the user proximate ground level. This arrangement of having the air blower unit attached to a base formed for use proximate ground level achieves several objectives. The user does not need to handle and manipulate the heavy blower unit, only the connected hose and nozzle which are lightweight and easy to handle over extended periods. In addition, the user's ears are somewhat isolated from the noisy blower unit which rests on the ground, a short, none the less, remote distance away from the user.

Figure 2:
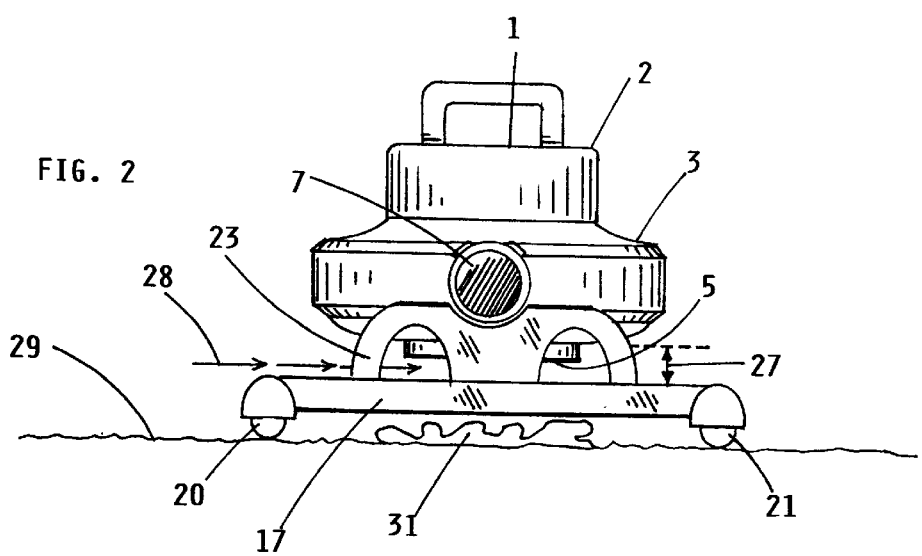
FIG. 2 shows a front view of the air blower apparatus show in FIG. 1.

FIG. 2 shows a front view of the air blower apparatus show in FIG. 1. Again, air blower apparatus 1 includes air blower unit 2 which has a housing 3. Housing 3 is molded from plastic and has air inlet 5 and air outlet 7. The motor (not seen in this view) inside housing 3 of blower unit 2 has a blade means attached (also not seen in this view) which produces an air flow through housing 3. Volumes of air at speed are drawn into inlet 5, move through and exit outlet 7. Blower unit 2 is attached to brackets 23 and 25 (bracket 25 is not seen in this view) which are attached to base 17. Brackets 23 and 25 prop up blower unit 2 upon base 17 a small amount represented by dimension 27 to provide an airway to inlet 5 with base 17 being solid. Preferred embodiments of the present invention are as shown in FIGS. 1 and 2, whereas blower unit 2 is positioned upon base 17, slightly propped up thereon to provide an airflow 28 which is substantially parallel ground level 29 as shown. Base 17 is formed for use proximate or close to ground level 29 so that blower unit 2 is also operated proximate or close to ground level 29. Accordingly, base 17 is provided with means for mobility at or proximate ground level. The means for mobility in this embodiment is four small caster type wheels of which two are shown in this figure as 20 and 21. Base 17 is further formed so that blower unit 2 is positioned thereon so that inlet 5 of blower unit housing 3 does not draw in debris represented by 31 found proximate ground level. Debris that is drawn in and passed through blower unit 2 can often damage the automobile or whatever is being dried. Accordingly, base 17 is formed to position blower unit 2 thereon such that the inlet 5 does not draw in debris proximate ground level to prevent blower unit 2 from discharging debris onto whatever is being dried.

FIG. 3 shows a right side elevation, cross-section view of the centrifugal blower unit 2 shown in FIGS. 1 and 2, wherein blower unit 2 has housing 3 with inlet 5 and outlet 7. Positioned and secured within housing 3 is motor 9 which has motor shaft 11. Blower unit 2 is positioned the same as in FIG. 1 with the motor shaft 11 perpendicular or about perpendicular to ground level 29. The present invention does not require that blower unit 2 be positioned such that the shaft is substantially perpendicular to ground level, however, preferred embodiments have the blower unit positioned this way in order to maximize the working life of any bearings that may be associated with motor 9 or motor shaft 11. Attached to motor shaft 11 is blade means 13 which when spun by motor 9 produces an airflow through housing 3, relative to shaft 11. The air flow 15 produced by blade means 13 is substantially perpendicular to motor shaft 11. Generally, all air blowing devices, including fans and blower units have a housing which a motor is mounted, of which a propeller or blade means is attached, to produce and direct an air flow through the housing. Generally, the housings serve two basic purposes which are to provide for the attachment of a motor, and, to provide an enclosed airway for the air flow produced by the motor. The housings can be very simple like a short tube, or elaborate like a molded scroll type housing. The motors are usually attached to the housing and can be small like the motors used in a hair dryer or larger like the internal combustion engines used in commercial size leaf blowers. Accordingly, the motors can be powered by electricity or some form of fuel. In virtually all instances the motor of an air blowing device will have a shaft, on which a propeller or "blade means" (any form of propeller or air blade) is attached to produce an air flow through the housing of the device. Generally, if the motor and blade means produce an air flow which is perpendicular to the motor shaft as shown in FIG. 3, it is considered a centrifugal type air blowing device; and, if the motor and blade means produce an air flow which is parallel to the motor shaft as shown in FIG. 4, it is considered an axial type fan or air blowing device.

When contemplating the acceleration of drying processes, for example, drying a freshly washed automobile, the axial or fan type air blowing devices usually do not produce sufficient air speed to fully affect the drying process. Centrifugal type devices tend to more fully affect the drying process by producing large volumes of air at high speeds. The high speed air flow tends to physically displace a liquid off of that which is being dried, while the high volume air flow tends to effectively evaporate and atomize the remaining liquid droplets. Although the present invention does not require a centrifugal type blower device, preferred embodiments of the present invention utilize a centrifugal blower unit (as defined herein) because the blower unit has the performance and features best suited for the application.

FIG. 4 shows a right side elevation, cross section view of a prior art axial type blower unit, wherein there is fan or blower unit 41 with housing 43. Housing 43 has motor 45 mounted therein. Motor 45 has motor shaft 47 on which blade means 49 is attached to produce air flow 51 which is substantially parallel to motor shaft 47. In this figure blade means 49 is simply a propeller. As earlier noted, the axial or fan type air blowing devices usually do not produce sufficient air speed to fully affect the drying process, and therefore, they are not preferred for the intended application.

FIG. 5 shows a front elevation view of a blower unit and mounting bracket formed for the mounting of that blower unit. Blower unit 51 has housing 52 with underside shape 53. Bracket 55 which is removable and attachable to base 58 shown has a cut-out 57 which is similar in shape to the underside shape 53 of housing 52 to support blower unit 51 thereon. Blower unit 51 may be attached to the brackets, for example bracket 55, any number of ways including but not limited to various fasteners, clips, clamps, elastic tie-downs etc. With bracket 55 being removable and attachable to base 58 shown, bracket 55 can be formed to specifically accommodate the shape of blower unit 51. The present invention air blower apparatus as specified earlier includes a blower unit, base and hose. From a manufacturing standpoint, it would be nice if there was one base that could accommodate a variety of different commercially available blower units (such as a hand-held centrifugal leaf blower). A base formed for the attachment of a variety of different brackets, each specifically formed to the shape of a commercially available blower unit is contemplated. This arrangement provides an opportunity to have one base, manufactured and formed for the attachment of a variety of different brackets whereby the base could accommodate a variety of different blower units. The base could be formed from a variety of materials, including but not limited to, plastic, metal and or a combination thereof.

FIG. 6 shows a front elevation view of another blower unit and mounting bracket formed for that blower unit. Blower unit 61 which is clearly different in shape to blower unit 51 of FIG. 5, has housing 62 with underside shape 63. Bracket 65 which is removable and attachable to base 58 shown which is the same base shown and used in FIG. 4. Bracket 65 has a cut-out 67 which is similar in shape to the underside shape 63 of housing 62 to support blower unit 61 thereon. Blower unit 61 may be attached to the brackets, for example bracket 65, by any number of ways including but not limited to various fasteners, clips, clamps, elastic tie-downs etc. With bracket 65 being removable and attachable to base 58 shown, bracket 65 can be formed to specifically accommodate the shape of blower unit 61. The present invention air blower apparatus as specified earlier includes a blower unit, base and hose. From a manufacturing standpoint, it would be nice if there was one base that could accommodate a variety of different commercially available blower units (such as a hand-held centrifugal leaf blower). A base formed for the attachment of a variety of different brackets, each specifically formed to the shape of a commercially available blower unit is contemplated. This arrangement provides an opportunity to have one base, manufactured and formed for the attachment of a variety of different brackets whereby the base could accommodate a variety of different blower units. The base could be formed from a variety of materials, including but not limited to, plastic, metal and or a combination thereof.

Upon reading and understanding the specification of the present invention described above, modifications and alterations will become apparent to those skilled in the art. It is intended that all such modifications and alterations be included insofar as they come within the scope of the patent as claimed or the equivalence thereof.

What is claimed is:

1. An air blower apparatus comprising;
a blower unit having a housing formed with an inlet and an outlet, and a motor therein having a shaft with blade means attached thereto for producing an air flow substantially perpendicular to said motor shaft; and,
a base being formed to attach said blower unit thereon, and position said blower unit with said motor shaft substantially perpendicular said ground level and such that the inlet of said blower unit does not draw in debris proximate said ground level, said base having means for mobility; and,
a hose being substantially flexible, attached to and extending from said blower outlet and having a sufficient inner diameter to substantially maintain said produced air flow.

2. An air blower apparatus of claim 1, wherein hose has a nozzle attached at one end thereof to assist a user in directing said produced air flow.

3. An air blower apparatus of claim 1, wherein said means for mobility is at least three small wheels attached to said base.

4. An air blower apparatus of claim 1, wherein said base is further formed so as to provide for the attachment of a variety of different brackets whereby said base can accommodate a variety of different blower units.

5. An air blower apparatus of claim 2, wherein said means for mobility is at least three small wheels attached to said base.

6. An air blower apparatus of claim 2, wherein said base is further formed so as to provide for the attachment of a variety of different brackets whereby said base can accommodate a variety of different blower units.

7. An air blower apparatus of claim 3, wherein said base is further formed so as to provide for the attachment of a variety of different brackets whereby said base can accommodate a variety of different blower units.

8. An air blower apparatus comprising;
a blower unit having a housing formed with an inlet and an outlet, and a motor therein having a shaft with blade means attached thereto for producing an air flow substantially perpendicular to said motor shaft; and,
a base being formed to attach said blower unit thereon for use proximate ground level and such that the inlet of said blower unit does not draw in debris proximate said ground level, said base having means for mobility, said base further being formed providing for the attachment of a variety of different brackets whereby said base can also accommodate a variety of different blower units; and,
a hose being substantially flexible attached to and extending from said blower outlet and having a sufficient inner diameter to substantially maintain said produced air flow.

9. An air blower apparatus of claim 8, wherein said hose has a nozzle attached at one end thereof to assist a user in directing said produced air flow.

10. An air blower apparatus of claim 8, wherein said means for mobility is at least three small wheels attached to said base.

11. An air blower apparatus of claim 8, wherein said base is further formed for the attachment of said blower unit thereon with the motor shaft of said blower unit substantially perpendicular said ground level.

12. An air blower apparatus of claim 9, wherein said means for mobility is at least three small wheels attached to said base.

13. An air blower apparatus of claim 9, wherein said base is further formed for the attachment of said blower unit thereon with the motor shaft of said blower unit substantially perpendicular said ground level.

14. An air blower apparatus of claim 10, wherein said base is further formed for the attachment of said blower unit thereon with the motor shaft of said blower unit substantially perpendicular said ground level.

15. A base for a blower unit having a housing formed with an inlet and outlet, and a motor therein having a shaft, said base producing an air flow substantially perpendicular to said motor shaft, said base being formed to attach said blower unit thereon and position said blower unit with said motor shaft substantially perpendicular said ground level and such that the inlet of said blower unit does not draw in debris proximate said ground level.

16. A base of claim 15, wherein said base is further formed so as to provide for the attachment of a variety of different brackets whereby said base can accommodate a variety of different blower units.

* * * * *

UNITED STATES PATENT AND TRADEMARK OFFICE
CERTIFICATE OF CORRECTION

PATENT NO. : 6,195,907 B1 Page 1 of 1
APPLICATION NO. : 09/354431
DATED : March 06, 2001
INVENTOR(S) : Bodner et al.

It is certified that error appears in the above-identified patent and that said Letters Patent is hereby corrected as shown below:

Col 6, line 16, claim 1, delete "thereon," and insert --thereon--.

Signed and Sealed this

Twenty-first Day of November, 2006

JON W. DUDAS
*Director of the United States Patent and Trademark Office*